(12) United States Patent
Floyd et al.

(10) Patent No.: US 8,635,099 B1
(45) Date of Patent: Jan. 21, 2014

(54) METHOD AND SYSTEM FOR PROVIDING SURVEYS

(75) Inventors: Michel Floyd, Redwood City, CA (US); Jim Carpenter, Palo Alto, CA (US)

(73) Assignee: GfK Custom Research, LLC, New York, NY (US)

( * ) Notice: Subject to any disclaimer, the term of this patent is extended or adjusted under 35 U.S.C. 154(b) by 2271 days.

(21) Appl. No.: 11/528,027

(22) Filed: Sep. 26, 2006

(51) Int. Cl.
*G06Q 10/00* (2012.01)
*G06Q 30/00* (2012.01)

(52) U.S. Cl.
USPC .............. 705/7.32; 705/14.1; 705/14.44

(58) Field of Classification Search
USPC ...................................... 705/7, 14
See application file for complete search history.

(56) References Cited

U.S. PATENT DOCUMENTS

| | | | |
|---|---|---|---|
| 5,754,787 A | 5/1998 | Dedrick | |
| 5,893,098 A | 4/1999 | Peters et al. | |
| 6,029,195 A | 2/2000 | Herz | |
| 6,064,980 A | 5/2000 | Jacobi et al. | |
| 6,070,145 A | 5/2000 | Pinsley et al. | |
| 6,098,048 A | 8/2000 | Dashefsky et al. | |
| 6,112,181 A | 8/2000 | Shear et al. | |
| 6,385,693 B1 | 5/2002 | Gerszberg et al. | |
| 6,397,212 B1 | 5/2002 | Biffar | |
| 6,477,504 B1 | 11/2002 | Hamlin et al. | |
| 6,513,014 B1 * | 1/2003 | Walker et al. | 705/10 |
| 6,532,458 B1 | 3/2003 | Chaudhuri et al. | |
| 6,539,392 B1 | 3/2003 | Rebane | |
| 6,542,886 B1 | 4/2003 | Chaudhuri et al. | |
| 6,571,216 B1 | 5/2003 | Garg et al. | |
| 6,697,824 B1 | 2/2004 | Bowman-Amuah | |
| 6,754,635 B1 | 6/2004 | Hamlin et al. | |
| 6,760,916 B2 | 7/2004 | Holtz et al. | |
| 6,772,139 B1 | 8/2004 | Smith, III | |
| 6,778,807 B1 | 8/2004 | Martino et al. | |
| 6,912,521 B2 | 6/2005 | Kraft et al. | |
| 6,999,987 B1 * | 2/2006 | Billingsley et al. | 709/203 |
| 7,054,828 B2 | 5/2006 | Heching et al. | |
| 7,233,908 B1 | 6/2007 | Nelson | |
| 7,269,570 B2 | 9/2007 | Krotki | |
| 7,343,417 B2 | 3/2008 | Baum | |
| 7,418,496 B2 | 8/2008 | Macey et al. | |
| 7,788,212 B2 | 8/2010 | Beckmann et al. | |
| 2001/0034647 A1 * | 10/2001 | Marks et al. | 705/14 |
| 2002/0016731 A1 | 2/2002 | Kupersmit | |
| 2002/0035568 A1 | 3/2002 | Benthin | |
| 2002/0038302 A1 * | 3/2002 | Maeda | 707/100 |
| 2002/0052774 A1 | 5/2002 | Parker et al. | |
| 2002/0077881 A1 | 6/2002 | Krotki | |

(Continued)

OTHER PUBLICATIONS

Notice of Allowance mailed Dec. 27, 2007 in U.S. Appl. No. 09/997,218, filed Nov. 30, 2001.

(Continued)

*Primary Examiner* — Yehdega Retta
(74) *Attorney, Agent, or Firm* — Dinicola & Young PC; Brian K. Dinicola

(57) ABSTRACT

A method and system for providing a survey comprises an incentive module, a survey determination module, a timing module, and a survey interface module. The incentive module determines a dynamic incentive for a panelist. The dynamic incentive is associated with the survey. The survey determination module provides the survey to the panelist. The timing module determines a survey time and if the panelist may perform another survey in a remaining time. The survey interface module provides a graphical representation of the survey to the panelist.

20 Claims, 6 Drawing Sheets

(56) References Cited

U.S. PATENT DOCUMENTS

| | | | |
|---|---|---|---|
| 2002/0128898 | A1 | 9/2002 | Smith, Jr. et al. |
| 2003/0002490 | A1 | 1/2003 | Wong et al. |
| 2003/0014320 | A1 | 1/2003 | Thompson et al. |
| 2003/0088458 | A1 | 5/2003 | Afeyan et al. |
| 2003/0105870 | A1 | 6/2003 | Baum |
| 2003/0144899 | A1* | 7/2003 | Kokubo .................. 705/10 |
| 2004/0073476 | A1 | 4/2004 | Donahue et al. |
| 2004/0133463 | A1 | 7/2004 | Benderev |
| 2005/0086587 | A1 | 4/2005 | Balz |
| 2006/0155513 | A1* | 7/2006 | Mizrahi et al. ............ 702/179 |
| 2007/0214239 | A1 | 9/2007 | Mechkov et al. |
| 2008/0082394 | A1 | 4/2008 | Floyd et al. |
| 2008/0104025 | A1 | 5/2008 | Dharamshi |
| 2008/0177859 | A1 | 7/2008 | Nickerson |
| 2008/0270412 | A1 | 10/2008 | Udayasankar |
| 2008/0313011 | A1 | 12/2008 | Rose |
| 2009/0083704 | A1 | 3/2009 | Floyd et al. |
| 2011/0029613 | A1 | 2/2011 | Hedditch |

OTHER PUBLICATIONS

U.S. Appl. No. 11/541,330, Michel Floyd, Method and System for Providing Multi-Dimensional Feedback, filed Sep. 29, 2006.

U.S. Appl. No. 11/903,272, Michel Floyd, System and Method for Expediting Information Display, filed Sep. 21, 2007.

"A Brief Introduction to Sampling", http://web.archive.org/web/19990220032218/http://pyschology.ucdavis.edu/rainbow/html/Fact_sample.html, Mar. 4, 2005, pp. 1-7.

"Regional Sampling Methods/Environmental Sampling and Monitoring Primer", Heidi Christopher and Dottie Schmitt, http://ewr.cee.vt.edu/environmental/teach/smprimer/design/sample.html, Dec. 6, 2006, pp. 1-5.

Decision Analyst, Inc. Marketing Research and Consulting Services, http://web.archive.org/web/19991012125037/decisionanalyst.com/servindex.htm, Mar. 4, 2005, pp. 1-15.

"The Organization Health Report: An HR Metric to Mobilize Executives into Action", Joseph S. Fiorelli, Gretchen A. Alarcon, and Eileen Taylor, Kelly Human Resource Planning, vol. 21, No. 2, pp. 12-19, 1998, from Dialog File 15, Item 2, 2005.

"InterSurvey is Providing Polls on 2000 Election", Knowledge Networks, Inc. press release, http://www.knowledgenetworks.com, Dec. 14, 1999, pp. 1-4.

"OnPolitics—What Americans Think: Lights out for Traditional Polls?", Richard Morin, Washington Post, http://www.washingtonpost.com/wp-srv/politics/polls/wat/archive/wat051500.htm, May 15, 2000, pp. 1-3.

"Perception and Learning Analyzers," Columbia Information Systems, MSInteractive, 2 pp.

"Probability Definitions: Example # 1", http://web.archive.org/web/20001209052000/http://stat.wvu.edu/SRS/Modules/ProbDef/urn...html, Dec. 9, 2000, Nov. 18, 2005, pp. 1-2.

"Web Surveys, The Sequel", Allan Rivlin, National Journal, Oct. 20, 1999, http://www.knowledgenetworks.com, pp. 1-4.

"Sampling With Replacement and Sampling Without Replacement", http://www.web.archive.org/web/19990823060052/ http://www.ma.utexas.edu/users/parker/sampling/repl.htm, Mar. 4, 2005.

"To Politically Connect, and Profitably Collect", Sarah Schafer, Washington Post, Dec. 13, 1999, http://www.knowledgenetworks.com, pp. 1-6.

"Listening to the Voice of the Employee", Ronald D. Snee, Quality Progress, vol. 28, Jan. 1995, pp. 91-95 from Dialog File 15, Item 3, 2005.

"Survey Sampling Methods", http://www.web.archive.org/web/20001003145831/http://www.statpac.com/surveys/sampling.htm, Dec. 6, 2006, pp. 1-2.

"Conducting a Survey", Paul White, http://www.cems.uwe.ac.uk/pwhite/SURVEY2/nodel.html, Dec. 6, 2006, pp. 1-4.

"SUDAAN 7: Statistical Analysis Software for Complex Sample Designs", Robert A. Yaffee, http://www.nyu.edu/its/pubs/connect/archives/97summer/yaffeesudaan.html, Nov. 18, 2005, pp. 1-3.

* cited by examiner

METHOD AND SYSTEM FOR PROVIDING SURVEYS

BACKGROUND

1. Field of the Invention

This invention relates generally to consumer surveys and more particularly to providing consumer surveys to panelists.

2. Description of the Related Art

To provide consumer surveys according to demographic, attitudinal, or behavioral profiles, a survey provider may form a contractual relationship with panelists having a known profile. The survey provider, for example, may supply a panelist with Internet access, award points, or otherwise compensate a panelist for taking a specified number of surveys over a period of time. For example, a panelist may agree to a 30 minute survey each week in return for 100 points that can be redeemed for goods or services.

The survey provider invites panelists to take a survey according to a random sampling or a specific demographic, attitudinal, or behavioral profile. However, the survey provider may have difficulty receiving responses to the survey. In some instances, a panelist may decide to not accept the invitation. For example, a higher income panelist may decide that 100 points is simply not worth the time. In other instances, a survey includes a screening question such as, "have you visited a zoo in the past three months?" if, for example, the survey is about zoos. If a panelist responds "no," the panelist does not take the survey and the survey provider is not able to invite the panelist to another survey that week. Often, the panelist does not spend the entire 30 minutes taking the survey. Even in instances where the panelist does take the survey, the panelist may spend only 10 minutes of the 30 minute session taking the survey.

It is desirable for survey providers to be able to offer an increased incentive to certain panelists within an unresponsive demographic, attitudinal, or behavioral profile. Survey providers also desire a way to use the full session of the panelists invited to take a survey using, for example, other surveys or sets of survey questions.

SUMMARY

In exemplary embodiments, a method for conducting a survey comprising determining a dynamic incentive for a panelist is provided. The dynamic incentive is associated with a main survey. If the main survey is available, the main survey is provided to the panelist. Upon completion of the main survey, remaining time in a survey session is determined. If there is time for a secondary survey and if the secondary survey is available, the secondary survey is provided. Determining the remaining time for the secondary survey may comprise determining a survey time. In exemplary embodiments, determining the survey time comprises comparing an actual time to the survey time, setting the survey time to a default time, or adaptively changing the survey time based on a median time. Providing the secondary survey may comprise reviewing a queue of surveys to select the next survey or selecting the secondary survey based on the remaining time.

The method may further comprise determining if a quota for the main survey is met, where the main survey is unavailable if the quota is met. Determining the dynamic incentive may comprise reviewing a profile associated with the panelist or changing the dynamic incentive if a quota for the main survey is not met. Determining the dynamic incentive may comprise determining immediacy of an end of a field period.

A system for conducting a survey comprises an incentive module, a survey determination module, a timing module, and a survey interface module. The incentive module determines a dynamic incentive for a panelist. The dynamic incentive is associated with a main survey. The survey determination module provides the main survey to the panelist. The timing module determines a survey time and a remaining time for a secondary survey. The survey interface module provides a graphical representation of the main survey to the panelist.

In exemplary embodiments, a survey set-up module may receive parameters of the main survey. A participant database may store a profile associated with the panelist. The profile may be used to determine the dynamic incentive. The survey determination module may also select the secondary survey from more than one queued surveys.

A machine readable medium has embodied thereon a program, the program executable to provide instructions for a method for conducting a survey, the method comprises determining a dynamic incentive for a panelist, the dynamic incentive associated with a main survey. If the main survey is available, the method also comprises providing the main survey to the panelist. The method further comprises determining a remaining time for a secondary survey and, if the secondary survey is available, providing the secondary survey.

The method may further comprise determining a demographic, attitudinal, or behavioral profile associated with the panelist, determining a survey time associated with the secondary survey. Additionally, the method may comprise selecting the main survey according to a demographic, attitudinal, or behavioral profile associated with the panelist, determining if the secondary survey is unavailable according to a survey quota, or changing the dynamic incentive if a survey quota associated with the main survey is not meet.

DETAILED DESCRIPTION

Exemplary embodiments provide systems and methods for conducting a survey including providing a main survey, providing a dynamic incentive to selected panelists for completing a survey, and incorporating queued surveys into a survey session. Advantageously, a specified profile group may be selected to receive an invitation to participate in a survey. Further, queued surveys may be provided to a panelist if the panelist is screened out of taking the survey or finishes the main survey before the session or survey time elapses. Additionally, an incentive may be dynamically determined and displayed before providing the survey to the panelist. In exemplary embodiments, the incentive may be based on a demographic, attitudinal, or behavioral profile associated with the panelist.

Unlike other methods for providing surveys to panelists, the survey provider utilizes more of the survey time that each panelist is required to fulfill and can provide additional incentives to selected panelists who may not otherwise perform the survey. As a result, the survey provider can more efficiently gather data and motivate desired panelists to complete a survey.

Figure 1:
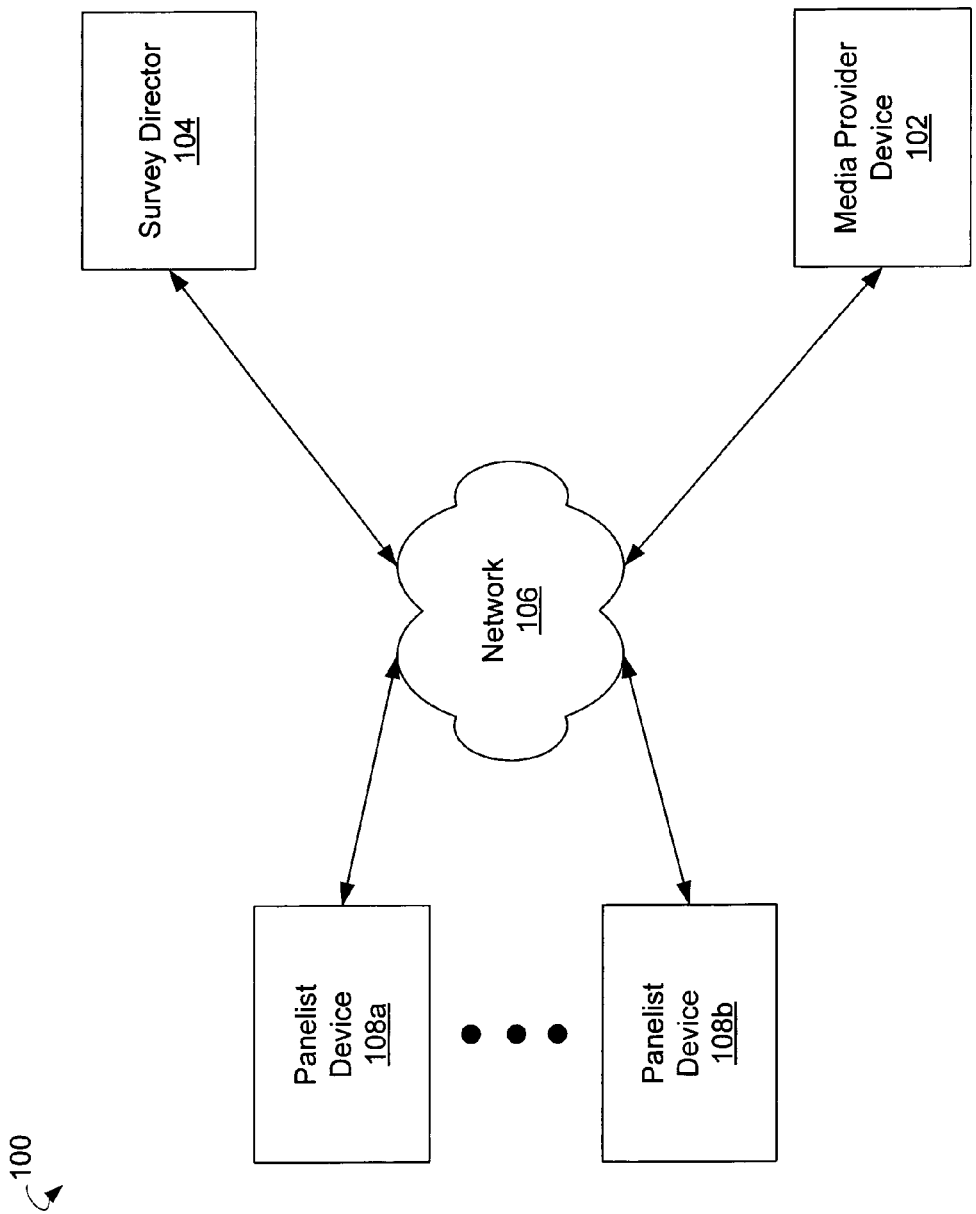
FIG. 1 depicts an online environment in which embodiments of the present invention may be practiced.

FIG. 1 illustrates an exemplary online environment 100 in which exemplary embodiments of the invention may be practiced. The exemplary online environment 100 comprises a media provider device 102, a survey director 104, a network 106, and at least one panelist device 108. In some embodiments, the network 106 may comprise a public network (e.g., the Internet) or a private network (e.g., a local area network).

The present embodiment allows a media provider using a media provider device 102 to submit media, surveys, or survey guidelines to the survey director 104. Media may comprise a written passage, an image, an audio recording, a movie, a political speech, a television program, an advertisement such as a television commercial, or Internet programming such as a Podcast®. The media provider is a person or entity who requests that a survey be administered to one or more panelists. For example, the media provider may comprise a marketing company, a public interest group, an industry group, a service provider, or a user of the survey director 104. The media provider may also specify a desired demographic, attitudinal, or behavioral profile of one or more panelists. The media provider device 102 may comprise a computing or digital device (e.g., a server, a personal computer, or the like).

In exemplary embodiments, the survey director 104 may receive the media from the media provider device 102 via the network 106 in exemplary embodiments. In alternative embodiments, the survey director 104 may receive media directly from an input device or the survey director 104 may create media for the media provider. The survey director 104 may generate one or more surveys and select one or more panelists in response to instructions received from the media provider device 102. The survey director 104 transmits survey invitations to the selected panelists, provides the survey to the panelist, and receives a survey response from the panelists. The survey director 104 may comprise a server or other computing or digital device. The survey director 104 is discussed in greater detail in connection with FIG. 2 and FIG. 3.

During the survey, the survey content may be displayed on a panelist device 108 coupled to the network 106. The survey content may be implemented on the panelist device using an interactive applet, a Java®module, a Macromedia® Flash file, or the like. In exemplary embodiments, the panelists are categorized by a demographic, attitudinal, or behavioral profile. The profile may comprise information about a panelist's age, gender, race, geographic location, income level, political affiliation, preferences, attitudes, and the like. The profile may be created before a panelist is receives an invitation to a survey using a questionnaire. The profile may be updated and/or reviewed to determine whether to send an invitation to a survey to a particular panelist.

It should be noted that the environment 100 may comprise more or fewer components. Further, the environment 100 may include any number of media provider devices 102, survey directors 104, and panelist devices 108. The environment 100 may further comprise components not relevant to the functionalities of the embodiments of the present invention.

Figure 2:
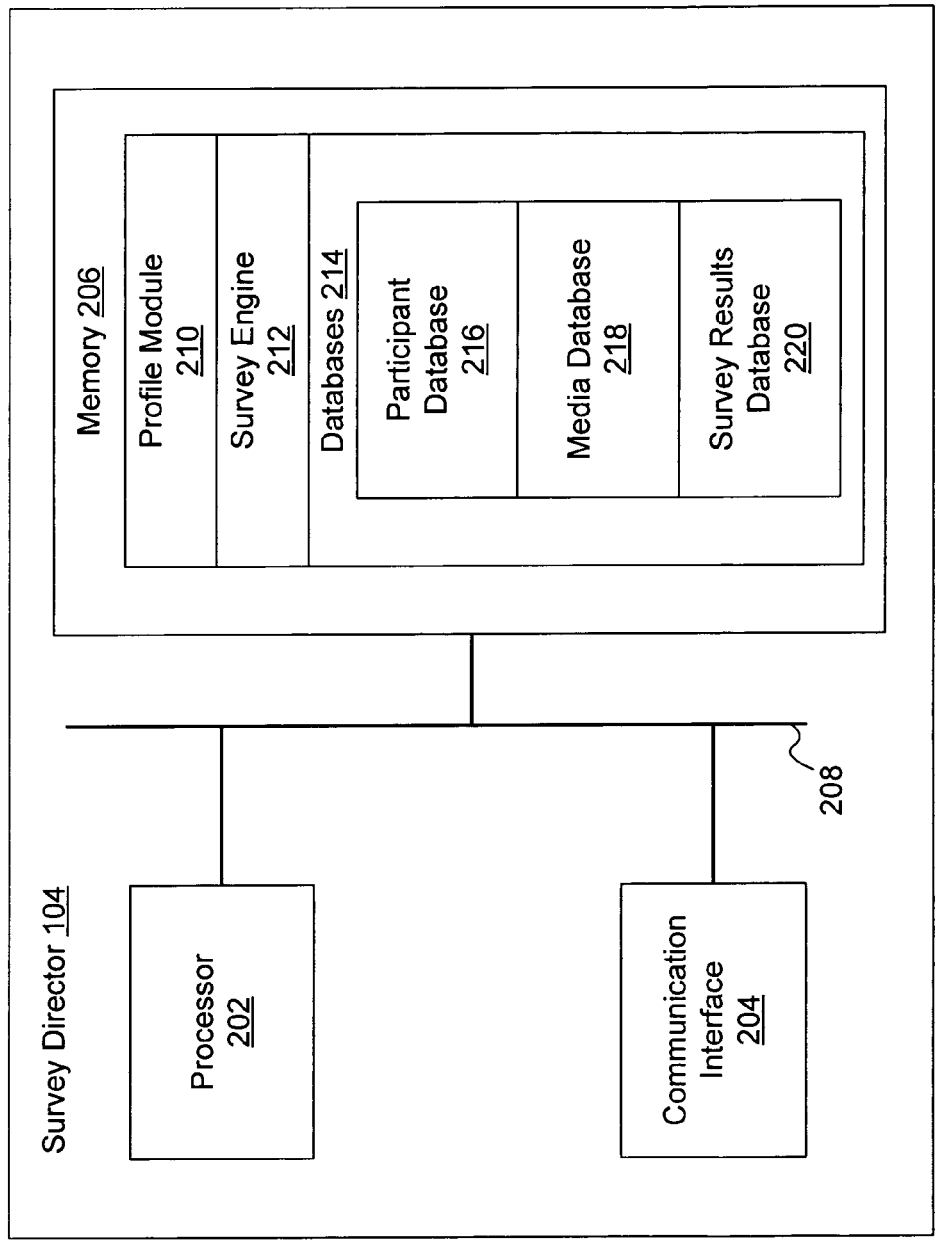
FIG. 2 depicts a block diagram of an exemplary survey director.

FIG. 2 depicts a block diagram of a survey director 104 according to an exemplary embodiment of the present invention. In one embodiment, the survey director 104 comprises a processor 202, a communication interface 204, a memory 206, and a bus 208. The processor 202 is configured to processes instructions stored in the memory 206 such as the profile module 210 and the survey engine 212. The memory 206 may further store a profile module 210, a survey engine 212, and one or more databases 214.

The communication interface 204 is configured to provide communications to and from the media provider device 102 and the panelist devices 108. In some embodiments, the communication interface 204 is configured to receive input from an operator (e.g., media provider device 102), to set-up a survey, and to provide survey results. The communication interface 204 also communicates with the panelist devices 108 to provide the surveys and receive corresponding feedback.

The profile module 210 is configured to set-up and maintain a profile associated with a panelist. The profile may be based on data received from the panelist, input via one or more surveys or other methods. The profile may include demographic information, preferences, and/or contact information. The profile module 210 is configured to collect the data comprising the profile and store the data in the databases 214. In some embodiments, the profile module 210 is configured to review the profile of a panelist to determine whether to send an invitation to participate in a survey to the panelist.

In exemplary embodiments, the survey engine 212 generates communications to, and processes communications from, the media provider devices 102 and the panelist devices 108. The survey engine 212 may select one or more main surveys for a, selected panelist and send additional surveys to the selected panelist when the main survey is complete. The survey engine 212 is discussed in greater detail in connection with FIG. 3.

The exemplary databases 214 may comprise a participant database 216, a media database 218 and/or a survey results database 220. In exemplary embodiments, the databases 214 may be located within the survey director, 104. In alternative embodiments, the databases 214 are located outside of the survey director 104 but coupled to the survey director 104.

The participant database 216 comprises data relating to panelists. This data may include demographic, attitudinal, or behavioral data such as age, location, gender, race, income level, hobbies, interests, and the like. This data may be gathered from the panelists based on, for example, surveys, questionnaires, purchasing habits, and/or geographic location. The panelists may provide this data on a periodic basis and/or the data may be continuously collected.

The exemplary media database 218 stores media such as images, video, or audio clips received from the media provider devices 102. The stored media are the media that the media provider desires feedback about from the panelists. The media may comprise multiple versions, translations, or the like. In some embodiments, the survey may not include media, but is comprised of just survey questions. Corresponding set-up data associated with the media and/or survey may also be stored with the media in the media database. The set-up data may comprise desired panelist demographic, behavioral, or attitudinal profiles, questions to be asked, a survey quota, a field period, and the like.

The exemplary survey results database 220 stores data received as feedback from the panelists. The survey results database 220 may additionally include data resulting from processing and analyzing the feedback. Other examples of databases that may be included in the databases 214 will be apparent to those skilled in the art.

Figure 3:
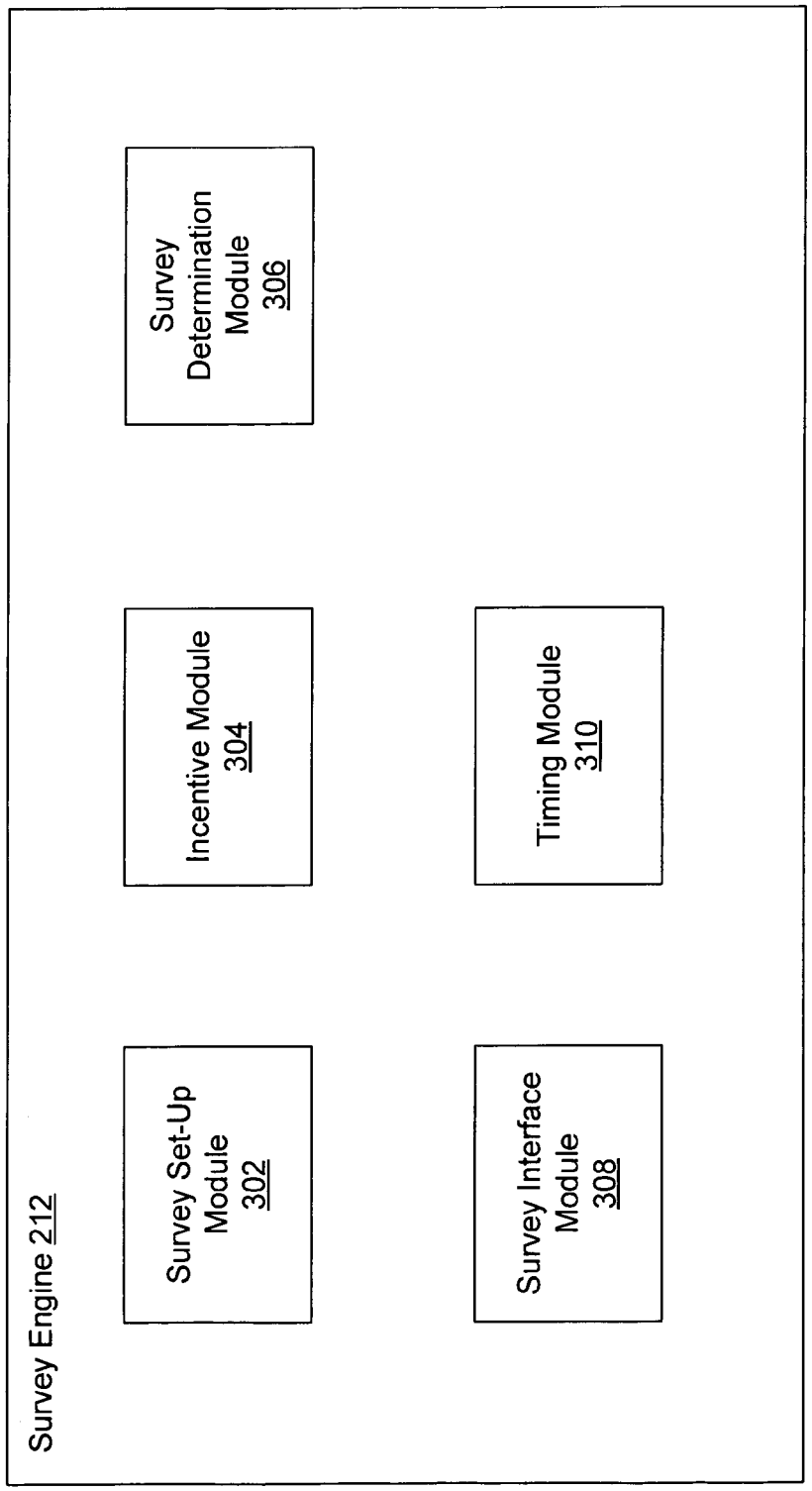
FIG. 3 depicts a block diagram of an exemplary survey engine.

FIG. 3 depicts a block diagram of the survey engine 212, according to one embodiment of the invention. The survey engine 212 may be configured to provide a dynamic incentive and one or more surveys to the panelists. In exemplary embodiments, the survey engine 212 comprises a survey set-up module 302, an incentive module 304, a survey determination module 306, a survey interface module 308, and a timing module 310.

In exemplary embodiments, the survey set-up module 302 provides a graphical user interface to the media provider device 102 to set-up the survey. The graphical user interface may include options to provide or select questions or media to be displayed to the panelists and to specify target demographic, attitudinal, or behavioral profile(s) of the panelists to be invited to participate in the survey. In alternative embodiments, the survey set-up module 302 may generate the survey based on information previously received from the media provider. The panelists may then be invited to participate based on their demographic, attitudinal, or behavioral profile. The graphical user interface may include an option to specify a quota in one or more demographic, attitudinal, or behavioral profiles. The quota is a number of panelist responses required to close the survey. The survey may become unavailable if the quota is met. The graphical user interface may additionally include an option to specify a field period. A field period is an amount of time that a survey is available to the panelists. For example, a field period may be two weeks. During these two weeks, panelists are invited to participate in the survey. After the two week period expires, the survey ends and feedback is analyzed.

In exemplary embodiments, the incentive module 304 is configured to determine an incentive to offer a panelist. In some embodiments, the incentive module 304 may change an incentive displayed to the panelist to persuade the panelist to respond to the survey. Panelists in certain demographic, attitudinal, or behavioral profiles (e.g., higher income Americans or African-Americans) may be less likely to respond to a particular survey invitation. To meet a quota associated with these demographic, attitudinal, or behavioral profiles, the incentive module 304 may offer an increased incentive to the panelist. The increased incentive may comprise additional payment, extra award points, a sweepstakes entry, a gift, or the like.

In exemplary embodiments, the incentive module 304 may also determine an incentive according to an amount of time remaining in the field period. For example, if the field period will expire in three days and a quota is not met, the incentive module 304 may change the incentive. In a further example, if the field period will expire in less than one day, the incentive module 304 may further adjust the incentive.

The exemplary survey determination module 306 is configured to select one or more surveys to provide to the panelist. The selected surveys may comprise a main survey and one or more secondary surveys. The main survey is a survey that is included in a survey invitation transmitted to the panelist devices 108 or the survey that the panelist device 108 receives at the beginning of a session. The main survey may be transmitted to the panelist according to a profile of the panelist. The secondary survey may comprise an additional set of questions appended onto the main survey. In other embodiments, the secondary survey is an additional survey. In some embodiments, a panelist may receive a general invitation to take a survey rather than an invitation to take a main survey.

The survey determination module 306 may determine whether a quota associated with a main survey or a secondary survey is met and select a secondary survey to provide to the panelist if the quota associated with the main survey is met or if the panelist screens out of the main survey. The secondary survey may also be provided after the panelist completes the main survey and time remains in the survey session. In various embodiments, the survey determination module 306 may select the secondary survey from one or more queued surveys according to a profile of the panelist, a priority rating of the survey, time remaining in a field period, and/or a survey time. For example, a high priority survey will be selected rather than a low priority survey. Further, in some instances, a longer survey will be selected rather than a shorter survey, for example, if a large amount of time remains in the survey session.

In exemplary embodiments, the survey interface module 308 provides a graphical user interface for the panelists to view the survey and input feedback. In one embodiment, the user interface may comprise an applet executable on a computing device at the panelist device 108. In other embodiments, the user interface may be downloaded and/or executed as a Java® script or as a Macromedia® Flash file.

In exemplary embodiments, the timing module 310 may be configured to budget a remaining time of the survey or panelist session. In some embodiments, a panelist may be available to respond to survey questions for an allocated period of time in a survey session, for example, fifteen minutes. To receive as many responses as possible during this time, the timing module 310 instructs the survey determination module 306 as to a remaining amount of time for each panelist so the survey determination module 306 may select a secondary survey or additional questions to provide to the panelist.

The timing module 310 may also gather data according to the length of the survey. For example, the timing module 310 may assign a default time to a new survey that has no or very few responses. In one implementation, the default time may be the length of the session, for example, fifteen minutes. Based on an actual time that one or more panelists take to perform each survey, the timing module 310 may determine a survey time used to budget the time of the sessions of other panelists. In one implementation, the survey time may comprise a median time of the actual times of more than one panelist.

For example, the survey session time may be fifteen minutes. Initially, the timing module 310 may assign a default time of fifteen minutes to a survey. Subsequently, five panelists perform the survey and have actual times of three minutes, four minutes, five minutes, six minutes and seven minutes. Based on these actual times, the timing module 310 may assign a new survey time of five minutes to the survey. According to this new survey time, after a panelist performs the survey, the remaining time in the session is ten minutes. Alternatively, the remaining time may be measured according to the actual time the panelist takes to respond to the survey. Based on the remaining time, one or more secondary surveys may be provided to the panelist.

Figure 4:
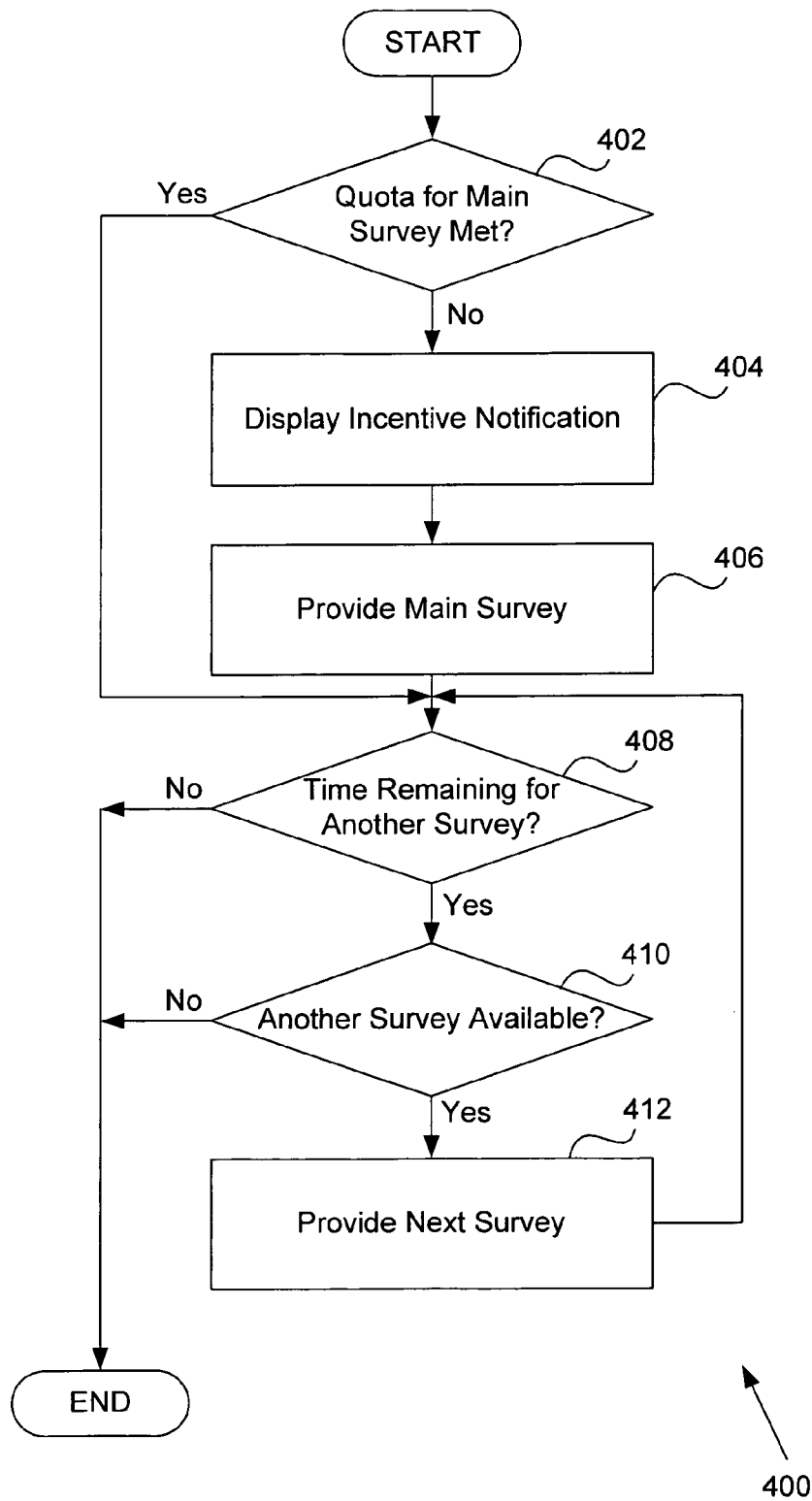
FIG. 4 depicts a flowchart of a process for providing a consumer survey to a panelist according to various embodiments of the invention.

FIG. 4 depicts a flowchart illustrating an exemplary surveying process 400. In exemplary embodiments, the survey engine 212 performs the surveying process 400 as discussed herein. For example, a panelist may receive an invitation to a survey. The panelist may also, for example, be shown an incentive to participate in the survey. If the participant accepts the invitation, the survey engine 212 may initiate the surveying process 400.

In exemplary embodiments, a determination is made as to whether a quota associated with a main survey is full in step 402. The survey determination module 306 may make this determination. The main survey may be associated with a quota that specifies a number of panelists needed to respond the survey before the survey can be closed. The quota may be associated with one or more demographic, attitudinal, or behavioral groups. If the quota is met, the surveying process 400 continues to step 408. If the quota is not met, the surveying process 400 continues to step 404.

In exemplary step 404, the incentive module 304 provides an incentive notification to the panelist device 108. The incentive notification may indicate a static incentive that does not change based on the panelist's demographic, attitudinal, or behavioral profile. In other embodiments, the incentive notification may indicate a dynamic incentive determined according to a demographic, attitudinal, or behavioral profile of the panelist. The dynamic incentive may also be determined according to other factors such as time remaining in a field period.

In step 406, a main survey is provided to the panelist. The main survey is the first survey that a panelist responds to during a survey session. The main survey may be selected according to the demographic, attitudinal, or behavioral profile of the panelist. The panelist may complete the main survey by screening out of the survey or by responding to all of the questions in the survey. The main survey may be associated with a survey time.

In exemplary step 408, the timing module 310 determines whether time remains in the survey session for another survey. Step 408 may be performed if the quota for the main survey is met in step 402, or if the panelist completes the main survey. If there is no time remaining in the survey session, the survey session ends. If there is time remaining in the survey session, according to an actual time or a calculated survey time, the surveying process 400 continues to step 410.

In exemplary embodiments, the survey determination module 306 determines whether another survey is available in step 410. Another survey may not be available if the quotas for the surveys that the panelist is eligible to perform are met. Alternatively, another survey may not be available if there is not enough time remaining in the survey session. If no other survey is available, the survey session ends. If there is another survey available, the survey engine 204 provides the next survey to the panelist in step 412. When the next survey is complete, the survey engine 204 returns to step 408 to determine whether there is time remaining for another survey.

Figure 5:
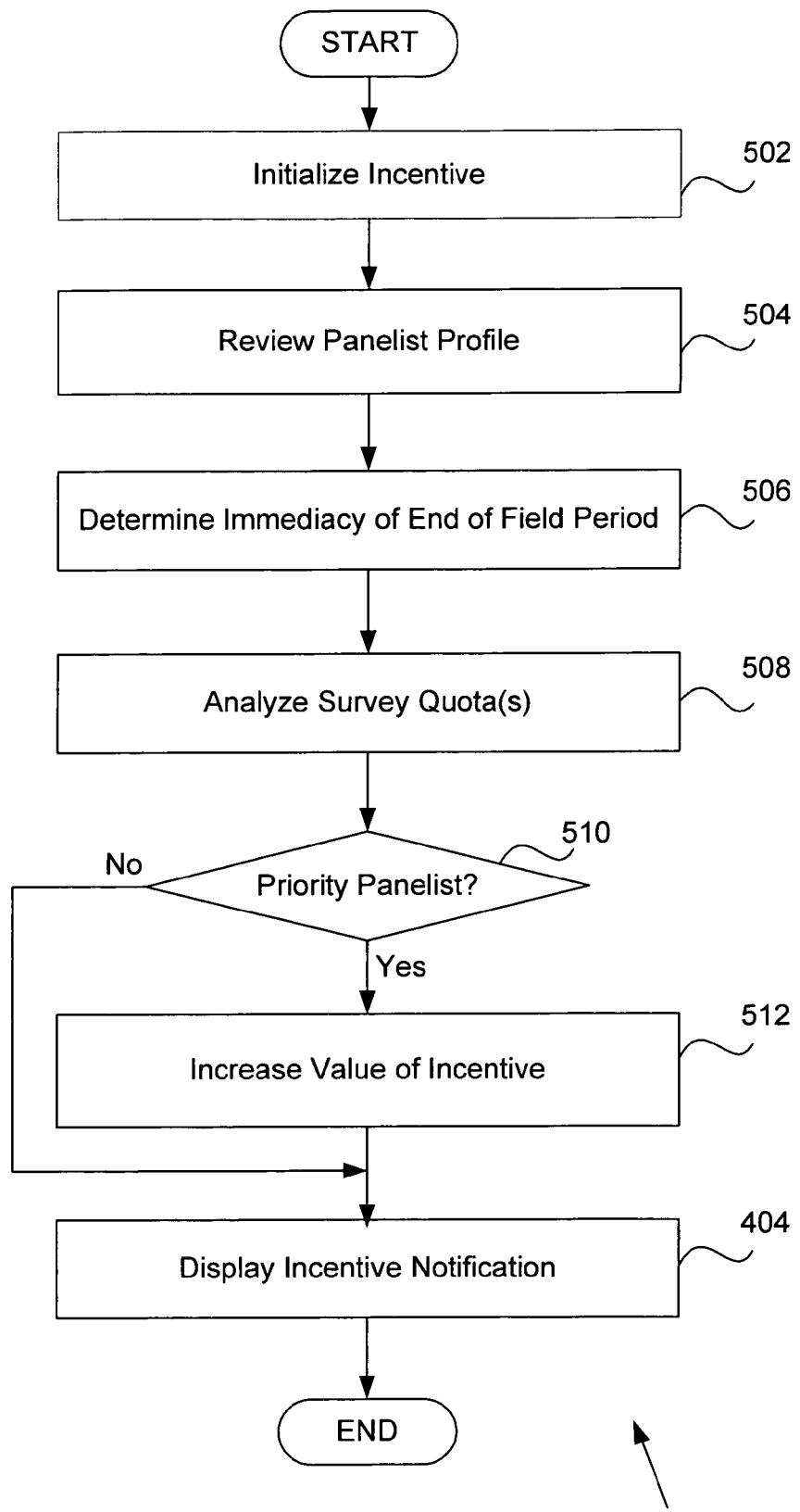
FIG. 5 depicts a flowchart of a process for displaying an incentive notification according to various embodiments of the invention.

FIG. 5 depicts a flowchart illustrating an exemplary incentive process 500. The incentive process 500 determines an incentive to associate with a main survey. In some embodiments, the incentive may be determined according to a demographic, attitudinal, or behavioral profile of a panelist. In further embodiments, the incentive process 500 may be performed to determine whether to change an incentive associated with a secondary survey.

In exemplary step 502, incentive module 304 may initialize an incentive to display to a panelist. To initialize the incentive, the incentive module may refer to a look-up table or use a heuristic to determine an initial value of the incentive. The initialized incentive may comprise a default incentive generated for multiple surveys. The incentive may comprise points or other rewards as discussed herein.

In exemplary embodiments, the incentive module 304 reviews the profile of the panelist in step 504. The profile of the panelist may include demographic, attitudinal, or behavioral information, past survey activity, and the like.

In exemplary step 506, the incentive module 304 determines the immediacy of the end of the field period. The immediacy of the end of the field period may be based on an amount of time remaining in the field period and/or a determination based on the number of responses received according to a survey quota. For example, if a field period will expire within two days, and only six responses are still required according to a survey quota, the immediacy of the end of the field period is low. If, however, one hundred responses are still required and only a few hours remain in the field period, the immediacy of the end of the field period is high.

In exemplary step 508, the incentive module 304 may analyze a survey quota associated with the survey. To analyze a survey quota, the incentive module determines the number of responses received from panelists who fit a profile required by the survey quota. The incentive module may calculate a percentage or other statistics to measure how many more responses are required to fulfill the survey quota. As discussed herein, some embodiments may comprise a survey associated with more than one survey quota. In these embodiments, the incentive module 304 may analyze each survey quota associated with the survey or analyze the survey quotas associated with the panelist profile reviewed in step 504.

The incentive module 304 may determine whether the panelist is a priority panelist in step 510. A priority panelist is a panelist for whom the survey provider will create an additional incentive to participate in a specific survey. For example, a survey quota for a survey about cosmetics may require 300 responses from women age 20-40 and 200 responses from a random population. If the panelist is a woman age 26 and 256 responses from women age 20-40 have been collected, the survey quota is not met. Because more responses are required, the incentive module 304 may increase the value of the incentive in step 512. The incentive module 304 may adjust the incentive further based on the immediacy of the end of the field period. To further illustrate, if the field period is set to expire in four hours, the incentive may be further increased. In contrast, if the field period will not expire for another week, the incentive may not be adjusted or may remain at the default incentive. If, however, 300 women age 20-40 have responded to the survey, the quota is met and the value of the incentive is either not increased or is decreased or eliminated altogether. After the value of the incentive is determined, the incentive notification may be displayed on the panelist device 108 in step 404 as described in connection with FIG. 4.

In various embodiments, step 504, step 506, and step 508 may be performed simultaneously or in any order. In further embodiments, other factors may also be taken into consideration to determine whether the panelist is a priority panelist.

Figure 6:
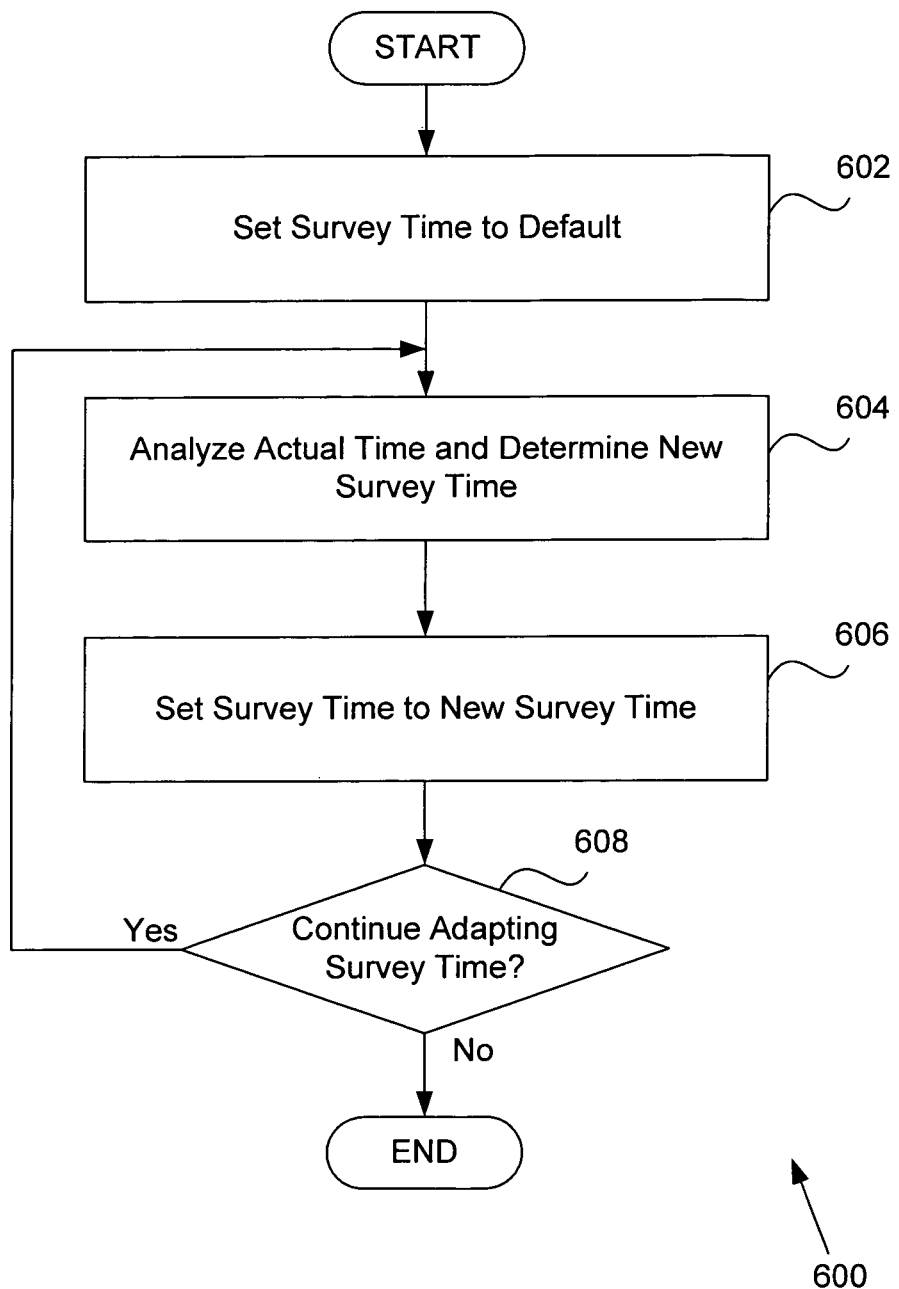
FIG. 6 depicts a flowchart of a process for determining a survey time according to various embodiments of the invention.

FIG. 6 depicts a flowchart of an exemplary timing process 600. In exemplary embodiments, the timing module 310 determines a survey time.

In exemplary step 602, the survey time associated with a survey is set to a default time. In one embodiment, the default time is equivalent to a duration of a survey session. In some embodiments, the default time may be based on a number of questions in a survey or a length of a media displayed during a survey.

If the survey has been taken by one or more panelists, the timing module 310 analyzes the actual time of the survey in step 604. The actual time of the survey is the amount of time a panelist used to either screen out of the survey or to respond to all of the questions in the survey. Also in exemplary step 604, the timing module 310 may determine a new survey time. The new survey time may be a median time. In other embodiments, the timing module 310 may determine a mean time or a mode of the actual times. A mode is the survey time associated with the largest number of participants, namely the most frequent survey time. In step 606, the timing module 310 sets the survey time to the new survey time. In other embodiments, the survey time may comprise the mean time or the mode.

In exemplary step 608, the timing module 310 determines whether to continue adapting the survey time. The timing module 310 may, for example, adapt the survey time if the actual survey times change substantially. The timing module 310 may not adapt the survey time if, for example, the survey quota is met and the survey is closed or unavailable. If the survey time remains accurate, the timing module 310 may not adapt the survey time. If the timing module 310 determines to adapt the survey time, the timing process 600 returns to step 604.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A method for conducting a survey, the method comprising:
executing instructions stored in memory, wherein execution of the instructions by a processor determines a dynamic incentive for a panelist based on a profile of the panelist and a quota regarding the profile, the quota associated with a main survey;
sending a notification to a panelist regarding the main survey, the notification including information regarding the dynamic incentive;
providing the dynamic incentive to the panelist upon completion of the main survey by the panelist within a survey session; and
providing a secondary survey to the panelist upon determination that remaining time in the survey session is greater than a secondary survey time.

2. The method of claim 1, further comprising determining that the quota for the main survey is met and assigning another main survey to the panelist, wherein the quota for the other main survey has not been met.

3. The method of claim 1, wherein determining the dynamic incentive comprises changing the dynamic incentive if the quota for the main survey is not met within a period of time remaining in the survey session.

4. The method of claim 1, wherein the dynamic incentive is based on an immediacy of an end of a survey session associated with the main survey.

5. The method of claim 1, wherein determining the remaining time comprises determining a main survey time.

6. The method of claim 5, wherein determining the remaining time comprises comparing an actual time to the main survey time.

7. The method of claim 5, wherein determining the main survey time comprises setting the main survey time to a default time.

8. The method of claim 5, wherein determining the main survey time comprises adaptively changing the main survey time based on a median time.

9. The method of claim 1, wherein providing the secondary survey comprises reviewing a queue of surveys to select the secondary survey.

10. The method of claim 1, wherein providing the secondary survey comprises selecting the secondary survey based on the remaining time.

11. A system for conducting a survey, the system comprising:
processor:
an incentive module stored in memory and executable by the processor to:
determine a dynamic incentive for a panelist based on a profile of the panelist and a quota regarding the profile, the quota associated with a main survey,
send a notification to the panelist regarding the main survey, the notification including information regarding the dynamic incentive, and
a survey engine stored in memory and executable by the processor to provide the dynamic incentive to the panelist upon completion of the main survey within a survey session;
a timing module stored in memory and executable by the processor to:
determine a time of the survey session, and
determine a remaining time in the survey session; and
a survey interface module configured to provide to the panelist a graphical representation of:
the main survey, and
a secondary survey upon determination that remaining time in the survey session is greater than a secondary survey time.

12. The system of claim 11, further comprising a survey set-up module configured to receive parameters of the main survey.

13. The system of claim 11, further comprising a participant database configured to store a profile associated with the panelist, the profile being accessed from the participant database to determine the dynamic incentive.

14. The system of claim 11, wherein the survey determination module is further configured to select a secondary survey upon determination that the remaining time in the survey session is greater than a secondary survey time.

15. A non-transitory machine readable storage medium having embodied thereon a program, the program being executable by a processor to perform a method for conducting a survey, the method comprising:
determining a dynamic incentive for a panelist based on a profile of the panelist and a quota regarding the profile, the quota associated with a main survey;
sending a notification to the panelist regarding the main survey, the notification including information regarding the dynamic incentive;
providing the dynamic incentive to the panelist upon completion of the main survey by the panelist within a survey session; and
providing a secondary survey to the panelist upon determination that remaining time in the survey session is greater than a secondary survey time.

16. The machine readable storage medium of claim 15, wherein the instructions are further executable to determine a profile associated with the panelist.

17. The machine readable storage medium of claim 15, wherein the instructions are further executable to determine a time of the survey session associated with the main survey.

18. The machine readable storage medium of claim 15, wherein the instructions are further executable to select the main survey based on the profile associated with the panelist.

19. The machine readable storage medium of claim 15, wherein the instructions are further executable to:
  determine that the quota for the main survey is met, and
  assign another main survey to the panelist, wherein the quota for the other main survey has not been met.

20. The machine readable storage medium of claim 15, wherein the instructions are further executable to change the dynamic incentive if the survey quota associated with the main survey is not met within a period of time remaining in the survey session.

\* \* \* \* \*